(12) United States Patent
Kopp et al.

(10) Patent No.: US 8,503,841 B2
(45) Date of Patent: Aug. 6, 2013

(54) DEVICE FOR COUPLING AN OPTICAL FIBER AND A NANOPHOTONIC COMPONENT

(75) Inventors: Christophe Kopp, Fontanil-Cornillon (FR); Badhise Ben Bakir, Grenoble (FR); Stéphane Bernabe, Moirans (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 255 days.

(21) Appl. No.: 12/997,528

(22) PCT Filed: Jun. 5, 2009

(86) PCT No.: PCT/FR2009/051069
§ 371 (c)(1),
(2), (4) Date: Apr. 18, 2011

(87) PCT Pub. No.: WO2009/150373
PCT Pub. Date: Dec. 17, 2009

(65) Prior Publication Data
US 2011/0182548 A1 Jul. 28, 2011

(30) Foreign Application Priority Data
Jun. 12, 2008 (FR) ...................................... 08 53895

(51) Int. Cl.
*G02B 6/34* (2006.01)
*G02B 6/26* (2006.01)
*G02B 6/42* (2006.01)
(52) U.S. Cl.
USPC ................... 385/37; 385/11; 385/15; 385/31; 385/39; 385/50

(58) Field of Classification Search
USPC ....................................................... 385/11, 37
See application file for complete search history.

(56) References Cited

U.S. PATENT DOCUMENTS
6,636,547 B2 * 10/2003 Evans et al. .................. 372/108
(Continued)

OTHER PUBLICATIONS

Yongbo Tang, et al: "Proposal for a Grating Waveguide Serving as both a Polarization splitter and an efficient coupler for silicon-on-insulator nanophotonic circuits", IEEE Photonics Technology Letters, IEEE Service Center Piscataway, NJ, US, vol. 21, No. 4, Feb. 15, 2009, XP011241116.

Wim Bogaerts, et al.: "Silicon-on-insulator nanophotonics" Proceedings of the SPIE—The International Society for Optical Engineering, SPIE, US, Vo. 5956, No. 1, Sep. 16, 2005, XP002488407.

(Continued)

*Primary Examiner* — Ryan Lepisto
(74) *Attorney, Agent, or Firm* — Vedder Price PC

(57) ABSTRACT

The invention relates to a device for coupling an optical fiber and a nanophotonic component formed on a first substrate, wherein the device comprises: an intermediate component formed on a second substrate including a first wave guide adapted for receiving light from the optical fiber and for transmitting the same to a first diffraction grating independently from the polarization of the incident light; second and third diffraction gratings formed on the first substrate and coupled to the nanophotonic component, the first diffraction grating being adapted to provide the first and second light beams respectively towards the second diffraction grating and the third diffraction grating, the first and second beams having perpendicular polarizations.

9 Claims, 3 Drawing Sheets

U.S. PATENT DOCUMENTS

| | | | |
|---|---|---|---|
| 6,813,399 B2 * | 11/2004 | Hamada | 385/11 |
| 7,065,272 B2 * | 6/2006 | Taillaert et al. | 385/37 |
| 7,113,526 B2 * | 9/2006 | Evans et al. | 372/23 |
| 7,881,571 B2 * | 2/2011 | Ben Bakir et al. | 385/37 |
| 2004/0184156 A1 | 9/2004 | Gunn | |
| 2010/0119229 A1 * | 5/2010 | Roelkens et al. | 398/79 |
| 2010/0322555 A1 * | 12/2010 | Vermeulen et al. | 385/28 |
| 2011/0008001 A1 * | 1/2011 | Doerr | 385/37 |

OTHER PUBLICATIONS

International Search Report for PCT/FR2009/051069 issued on Jan. 8, 2010.

International Preliminary Examination Report and Written Opinion in PCT/FR2009/051069 issued on Jan. 18, 2011.

* cited by examiner

DEVICE FOR COUPLING AN OPTICAL FIBER AND A NANOPHOTONIC COMPONENT

FIELD OF THE INVENTION

The present invention relates to integrated optical components, and more specifically to a device for coupling an optical fiber with a nanophotonic component.

DISCUSSION OF PRIOR ART

Integrated optical components are more and more often used in the field of telecommunications, especially for the transmission, processing, and/or storage of data. Integrated optical components may have many functions, for example transmission, reception, multiplexing, demultiplexing, modulation, demodulation, spectral routing, amplification, accumulation, filtering, resonator.

Integrated optical or optoelectronic components are generally formed inside and on top of semiconductor wafers similar to those used in microelectronics. An integrated optical circuit comprises one or several elementary optical components carrying out a processing on one or several light beams. The light beams are conveyed between the elementary optical components by optical waveguides.

The integration of an increasing number of functions on a same chip requires a miniaturization of integrated optical components, and thus a miniaturization of optical waveguides. When the waveguides used have dimensions smaller than one micrometer, it is spoken of a nanophotonic component.

Nanophotonic components comprising waveguides for example having $0.2 \times 0.5$-$\mu m^2$ cross-sections will here be considered. Such waveguides generally have the disadvantage of only being optimized and functional for waves having a polarization parallel to the support plane on which the waveguide is formed. Such waves are called transverse electric polarization waves, or "TE" waves.

FIG. 1 shows an example of a nanophotonic waveguide of rectangular cross-section and illustrates the propagation of a TE light wave in this waveguide.

The shown waveguide is formed of a silicon strip 11 which extends on an insulating support 13, for example, made of silicon oxide. A single- or multiple-layer coating, not shown, is formed on silicon strip 11 to ensure the propagation of light waves in silicon strip 11. In the light propagation direction, shown by an arrow 15, the propagation of a TE light wave 17 has been shown, in the main plane of the waveguide.

In a nanophotonic waveguide such as that of FIG. 1, waves of a polarization perpendicular to the main plane of the waveguide, called transverse magnetic polarization, or "TM" waves, are strongly attenuated.

For medium and long distance applications, the preferred optical transport means are optical fibers. A conventional type of optical fiber is formed of a central core surrounded with a cladding, the core having a slightly greater refractive index than the cladding. This enables to confine the light in the optical fiber core. The fiber cladding is generally covered with a plastic protection. The core of the optical fibers has a diameter at least equal to the wavelength in the core of the light signal which is desired to be transmitted, for example, on the order of from 3 to 10 μm for near infrared. Thus, when an optical fiber is desired to be coupled with a nanophotonic component waveguide, a first problem is the size matching between the optical fiber and the waveguide.

Further, in an optical fiber, the polarization state of a light beam is unknown and unstable. Indeed, the polarization of a light beam generally varies along the optical fiber. Moreover, many factors, such as temperature, cause an additional variation, which is unpredictable in practice, of the beam polarization in the optical fiber.

FIG. 2 is a front view of the nanophotonic waveguide of FIG. 1 formed on an insulating support 13. On top of nanophotonic waveguide 11 is formed a layer or a layer assembly 19 enabling to confine the light beam in this waveguide.

In FIG. 2, two examples of wave vectors of same intensity but of different polarizations originating from an optical fiber and reaching the input of waveguide 11 have been shown. First and second light signals 21 and 23 respectively have a polarization with direction substantially 30° away from the plane of support 13 and a polarization with a direction substantially 60° away from the plane of support 13. When a polarization signal 21 or 23 reaches the input of waveguide 11, only the TE polarization component of this signal is specifically transmitted by the waveguide, with respect to the TM component. Thus, the signal transmitted by the waveguide is not representative of the intensity of the received signal. If the intensity of the signal provided by the fiber is desired to be recovered, not only the TE component, but also the TM component, has to be taken into account.

Various devices for coupling an optical fiber with nanophotonic components which take into account the TE and TM components of the incident light intensity are known. Especially, publication "Silicon-on-insulator nanophotonic", by Wim Bogaerts et al., SPIE Optics and Optoelectronics, 5956, Poland, p. 5956R-1-15 (2005), provides positioning an optical fiber perpendicularly to the surface of a nanophotonic component at the level of a bidimensional grating formed at the surface of the nanophotonic component. The bidimensional grating is associated with two nanophotonic waveguides and enables to transmit, in TE form, the two components of perpendicular polarizations of the beam crossing the optical fiber to the waveguides. Such a device has several disadvantages. In particular, the need to position the optical fiber perpendicularly to the main plane of the circuit results in bulky assemblies.

SUMMARY

A device enabling to separate perpendicular polarizations of a beam going through an optical fiber to provide the same to a nanophotonic component is thus needed, this device have a low thickness.

Thus, an embodiment of the present invention provides a device for coupling an optical fiber with a nanophotonic component formed on a first support, the device comprising:
an intermediary component formed on a second support, comprising a first waveguide capable of receiving the light from the optical fiber and of transmitting to a first diffraction grating whatever the polarization of the incident light;
second and third diffraction gratings formed on the first support and coupled to the nanophotonic component,
the first diffraction grating being capable of delivering first and second light beams towards, respectively, the second diffraction grating and the third diffraction grating, the first and second beams having perpendicular polarizations.

According to an embodiment, the first and second supports are parallel.

According to an embodiment, the first waveguide is a waveguide with a substantially square cross-section.

According to an embodiment, the first waveguide has a cross-section of at least the same order of magnitude as the cross-section of the fiber core.

According to an embodiment, the device further comprises an adapter system between the optical fiber and the first waveguide.

According to an embodiment, integrated optical processing components are formed on the intermediary component at the level of the first waveguide.

According to an embodiment, the first and second supports are separated by a distance ranging between 20 and 150 µm, preferably between 30 and 70 µm.

According to an embodiment, the first and second supports are attached to each other, with interposed spacers.

BRIEF DESCRIPTION OF THE DRAWINGS

The foregoing and other objects, features, and advantages of the present invention will be discussed in detail in the following non-limiting description of specific embodiments in connection with the accompanying drawings.

For clarity, the same elements have been designated with the same reference numerals in the different drawings and, further, the various drawings are not to scale.

DETAILED DESCRIPTION

To solve the above-mentioned problems of polarization and size matching between an optical fiber and a nanophotonic component, the present description provides using, between these elements, an intermediary component enabling a low-loss coupling between the fiber core and diffraction gratings formed on the support of the nanophotonic component, the intermediary component being formed in a plane parallel to that of the support of the nanophotonic component.

Figure 1:
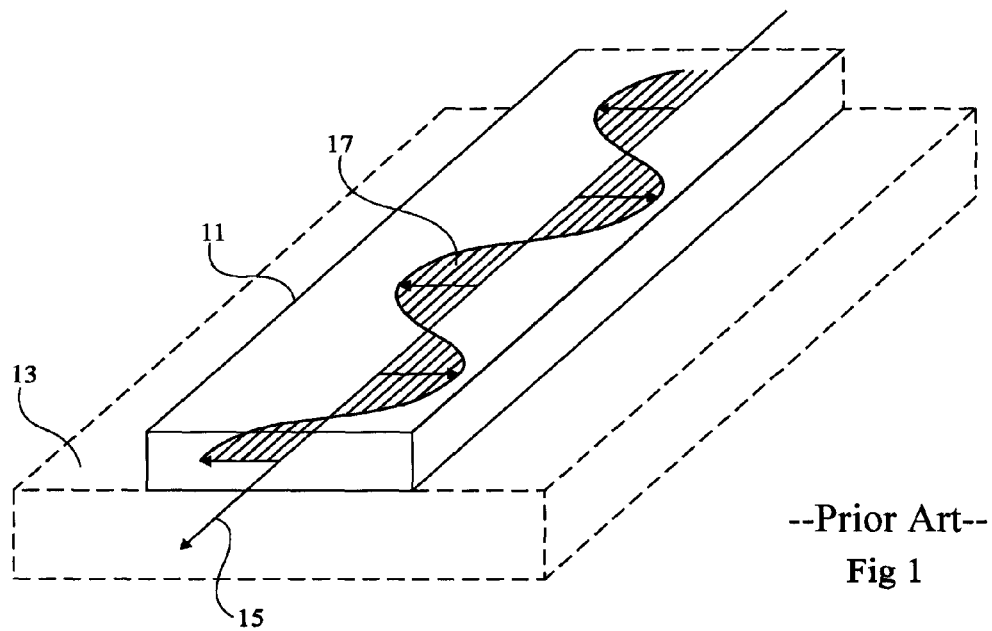
FIG. 1, previously described, illustrates the behavior of a light beam in a nanophotonic waveguide.
Figure 2:
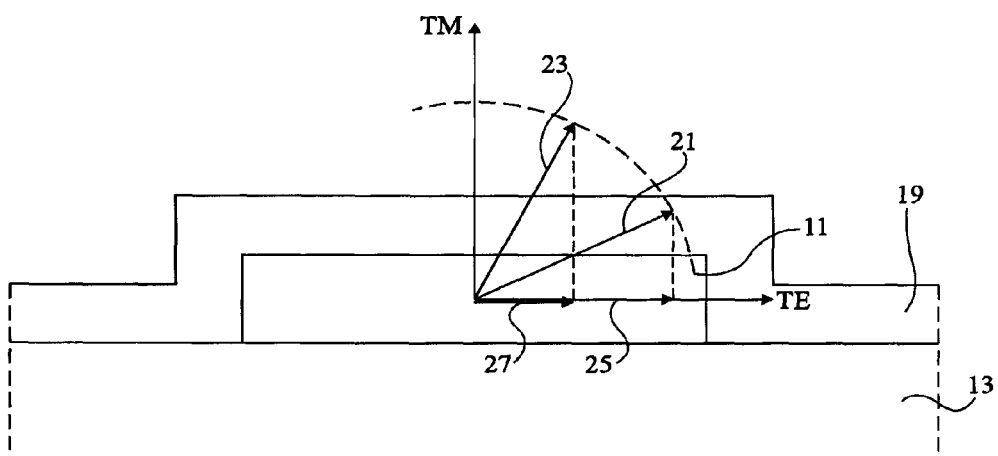
FIG. 2, previously described, illustrates the propagation of light beams of different polarizations in a nanophotonic waveguide.
Figure 3:
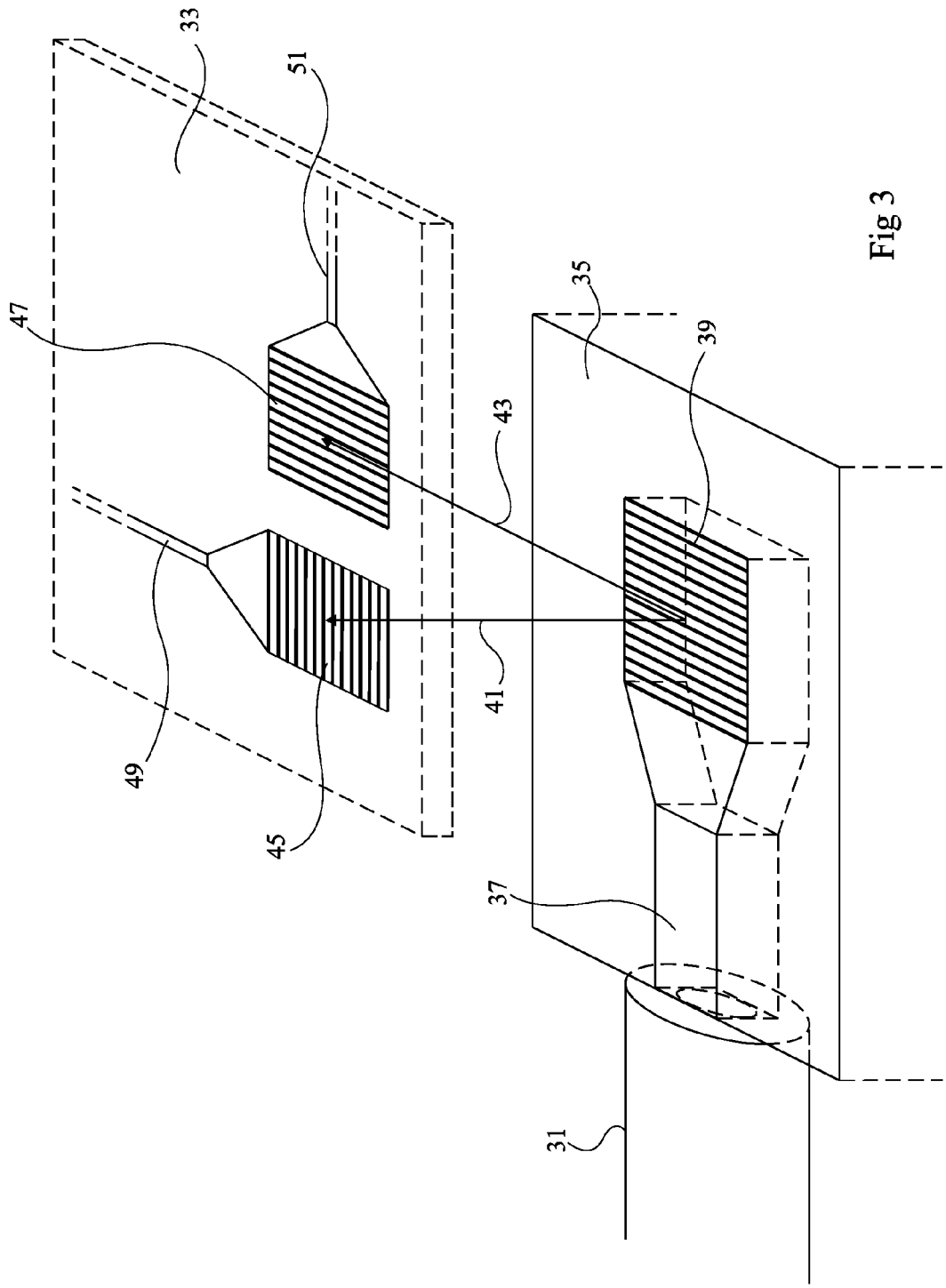
FIG. 3 illustrates in perspective view a device according to an embodiment of the present invention.
Figure 4:
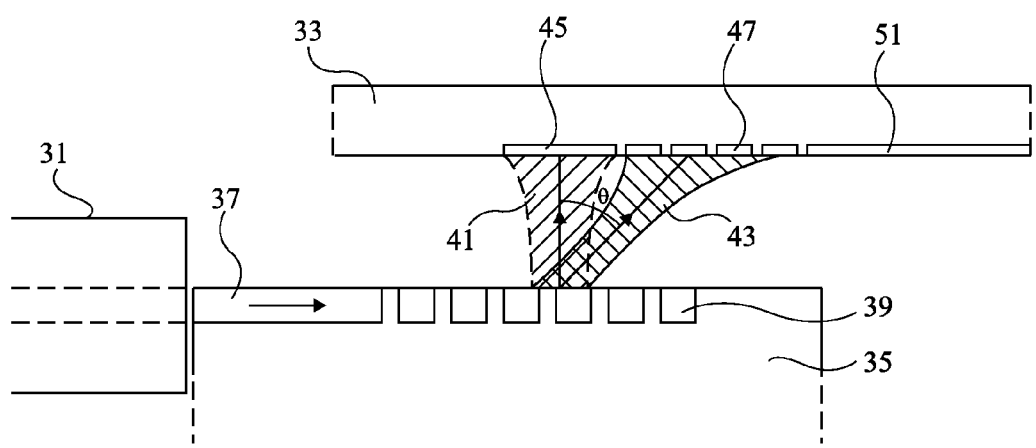
FIG. 4 is a side view of the device of FIG. 3.

FIG. 3 illustrates, in perspective view, a device according to an embodiment of the present invention enabling to couple an optical fiber with a nanophotonic waveguide. FIG. 4 is a side view of the device of FIG. 3.

An optical fiber 31 having a core with a diameter ranging between 3 and 10 µm is desired to be coupled with a nanophotonic component (not shown) formed inside and on top of a support 33, this nanophotonic component comprising waveguides of dimensions much lower than the diameter of the fiber core, for example, $0.2 \times 0.5$ µm$^2$.

An intermediary coupling component is formed on a support 35 parallel to support 33 of the nanophotonic component. The intermediary component comprises an input waveguide 37 and a diffraction grating 39 formed at the surface of support 35. The core of optical fiber 31 is arranged to illuminate input waveguide 37. Input waveguide 37 is sized to have a low sensitivity to the polarization of the beam delivered by optical fiber 31, to entirely transmit this beam. For this purpose, each dimension of waveguide 37 is greater than or equal to the wavelength of the light which is desired to be transmitted. In the shown example, waveguide 37 has a square cross-section and a side length equal to the diameter of the optical fiber core. Thus, the light beam conveyed by optical fiber 31 is entirely transmitted to and conveyed by the waveguide.

As a variation, the diameter of optical fiber 31 may be greater than the waveguide dimensions. In this case, an input matching structure will be provided for the intermediary component, for example, a taper-type size adapter. This element is a 2D or 3D structure which widens the dimensions of input waveguide 37 at the edge of support 35. Waveguide 37 may have a cross-section of $3 \times 3$ µm$^2$, of $8 \times 6$ µm$^2$, or of $10 \times 10$ µm$^2$, according to the optical wavelengths to be processed.

The light beam conveyed by optical fiber 31 is thus entirely delivered by waveguide 37 to diffraction grating 39. As an example, waveguide 37 may be formed of a silicon strip which extends on an insulating layer at the surface of support 35. Diffraction grating 39 may be formed of silicon slots. An insulating layer, not shown, extends on support 35 of the intermediary component above waveguide 37 and diffraction grating 39.

Diffraction grating 39 receives the light from waveguide 37 and provides two light beams 41 and 43 only having their directions indicated in FIG. 3. Light beams 41 and 43 have directions substantially perpendicular to the surface of support 35. Each of beams 41 and 43 corresponds to one of the two perpendicular TE or TM polarizations going through input waveguide 37.

As better shown in FIG. 4, diffraction grating 39 is provided so that beam 41 is directed towards support 33 of the nanophotonic component along a direction perpendicular to the support of intermediary component 35 and that beam 43 is directed towards support 33 of the nanophotonic component along a direction forming an angle θ with the direction of beam 41. Beams 41 and 43 separate between the intermediary component and the support of the nanophotonic component. To avoid for beams 41 and 43 to overlap at the level of support 33, diffraction grating 39 is provided so that angle θ is sufficient. For example, if the diameter of beams 41 and 43 at the output of the intermediary component is 10 µm and if the distance between the nanophotonic and intermediary components is 50 µm, the diameter of beams 41 and 43 at the level of support 33 is approximately 13.8 µm. In this case, an angle θ of 20° is sufficient to avoid for beams 41 and 43 to overlap at the level of support 33. As an example, the distance between the support of intermediary component 35 and support 33 of the nanophotonic component may range between 20 and 150 µm, preferably between 30 and 70 µm.

On the lower surface of support 33 of the nanophotonic component, facing intermediary component 35, are present two diffraction gratings 45 and 47. Diffraction gratings 45 and 47 are respectively coupled to nanophotonic waveguides 49 and 51, themselves coupled to the nanophotonic components. The nanophotonic component may thus receive light waves originating from the nanophotonic waveguides. Diffraction gratings 45 and 47 and associated waveguides 49 and 51 have perpendicular directions, at the surface of support 33. Diffraction gratings 45 and 47 are placed on support 33 so that beam 41 reaches diffraction grating 45 and that beam 43 reaches diffraction grating 47.

The device of FIGS. 3 and 4 operates as follows. The light beam crossing waveguide 37 comprises two perpendicular TE and TM polarization components. The TE polarization component is transmitted by diffraction grating 39 to diffraction grating 47 (beam 43) and the TM polarization component is transmitted by diffraction grating 39 to diffraction grating 45 (beam 41). Due to the perpendicular positioning of diffraction gratings 45 and 47 at the surface of the nanophotonic component, gratings 45 and 47 provide beams of TE polarization to their associated waveguides, respectively 49 and 51. Each waveguide 49 and 51 then provides the beams of TE polarization to nanophotonic components or elements (not shown) formed on support 33.

Figure 5:
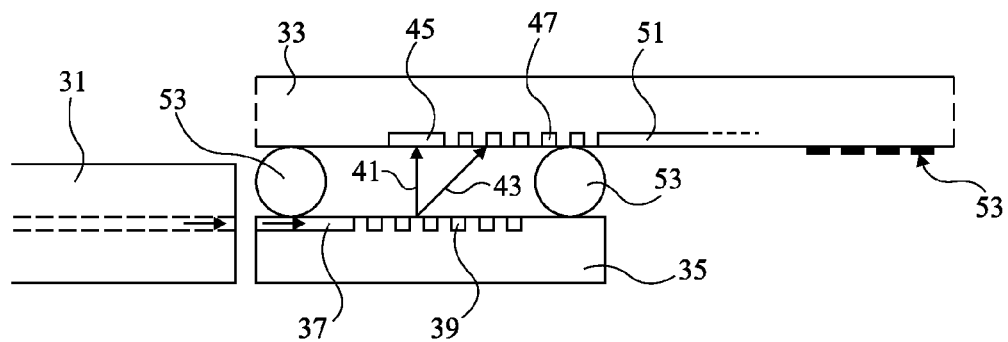
FIG. 5 illustrates the connection between an intermediary coupling component according to an embodiment of the present invention and a nanophotonic component support.

FIG. 5 illustrates a connection between the intermediary component according to an embodiment of the present invention and the support of the nanophotonic component.

This drawing shows the elements of FIGS. 3 and 4, that is, optical fiber 31, the support of nanophotonic component 33, and the support of intermediary component 35. This drawing illustrates an example of possible connection between supports 33 and 35 enabling to keep a constant distance between these supports. In the shown examples, supports 33 and 35 are maintained with respect to each other via spacers 53, for example, balls. As seen previously, the balls may have a diameter on the order of a few tens of micrometers, for example, 50 μm. Many methods enabling to form such balls are known.

Any known device for fastening supports 33 and 35 to each other, enabling to ensure a constant distance between these supports may also be provided. As shown as an illustration in FIG. 5, electronic components may also be formed on support 33 and conductive contact pads 53 may be formed on the lower surface of support 33 for the connection of the electronic components to elements external to the device.

In FIGS. 3 to 5, waveguides 37, 49, and 51 have been shown as being strip-type waveguides (silicon strip surrounded with silicon oxide). It should be noted that any other known waveguide type may be used for guides 37, 49, and 51. For example, the use of ridge-shaped guides may be provided.

Similarly, diffraction gratings 39, 45, and 47 may have any known structure. To improve the coupling rate between diffraction gratings 39 and 45/47, reflective structures may be formed at the level of these gratings. For example, it may be provided to add Bragg mirrors, metal mirrors, or again photonic crystals under and/or on diffraction gratings 39, 45, and 47.

Many methods for manufacturing waveguides and diffraction gratings on semiconductor supports are known. It may for example be provided to use a substrate of silicon-on-insulator type (SOI), to perform a first silicon photolithography to form the strips of the diffraction grating, and then to perform a second photolithography to define the contour of the waveguides and of the diffraction gratings. An insulating layer is then formed on the structure. The optical waveguides may also be formed at the surface of an insulating layer by laser writing into a semiconductor material formed on the insulating layer, or by implantation.

Thus, an embodiment of the present invention provides a device which has a very low sensitivity to polarization. The attenuation between beams 41 and 43 is typically lower than 1 or 2 dB. Further, the device has the advantage of having a low thickness, since the introduction of light from the optical fiber occurs through the side of the intermediary component. Thus, the device discussed herein may be provided in structures of low thickness.

Specific embodiments of the present invention have been described. Various alterations and modifications will occur to those skilled in the art. It may in particular be provided to also perform optical processings at the level of the intermediary component. For this purpose, integrated optical processing components are formed at the level of guide 37, between the input of guide 37 and diffraction grating 39. The optical processings carried out in such components are processings which do not depend on the polarization of the light beam going through the guide, for example, a spectral multiplexing, a spectral demultiplexing, or a spectral filtering. Thus, functions little dependent on the polarization at the intermediary component level and functions dependent on the polarization at the nanophotonic component level may be achieved.

As a variation, a coupling device symmetrical to the device of FIG. 3, that is, a device enabling to couple an output of a nanophotonic component to an optical fiber, may be provided. In this case, adapted beams crossing nanophotonic waveguides will be transmitted, via diffraction gratings formed on the support of the nanophotonic circuit, towards a diffraction grating formed in an intermediary component. The diffraction of the intermediary component will be coupled to a waveguide having a low sensitivity to polarization, capable of delivering an output light beam towards an optical fiber.

The invention claimed is:

1. A device for coupling an optical fiber with a nanophotonic component formed on a first support, the device comprising:
    an intermediary component formed on a second support, comprising a first waveguide capable of receiving the light from the optical fiber and transmitting it to a first diffraction grating whatever the polarization of the incident light;
    second and third diffraction gratings formed on the first support and coupled to the nanophotonic component,
    the first diffraction grating being capable of delivering first and second light beams towards, respectively, the second diffraction grating and the third diffraction grating, the first and second beams having perpendicular polarizations.

2. The device of claim 1, wherein the first and second supports-are parallel.

3. The device of claim 1, wherein the first waveguide is a waveguide of substantially square cross-section.

4. The device of claim 1, wherein the first waveguide has a cross-section of at least the same order of magnitude as the cross-section of the fiber core.

5. The device of claim 1, further comprising an adapter system between the optical fiber and the first waveguide.

6. The device of claim 1, wherein integrated optical processing components are formed on the intermediary component at the level of the first waveguide.

7. The device of claim 1, wherein the first and second supports-are separated by a distance ranging between 20 and 150 μm.

8. The device of claim 7, wherein the distance is between 30 and 70 μm.

9. The device of claim 1, wherein the first and second supports are attached to each other, with interposed spacers.

* * * * *